(12) United States Patent
Cahill (10) Patent No.: US 8,464,842 B2
(45) Date of Patent: Jun. 18, 2013

(54) BRAKE WEAR MEASUREMENT SYSTEM AND METHOD

(75) Inventor: Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 1150 days.

(21) Appl. No.: 12/388,374

(22) Filed: Feb. 18, 2009

(65) Prior Publication Data
US 2010/0206671 A1    Aug. 19, 2010

Related U.S. Application Data

(63) Continuation-in-part of application No. 12/372,069, filed on Feb. 17, 2009.

(51) Int. Cl.
*F16D 66/02*    (2006.01)

(52) U.S. Cl.
USPC ..................................... 188/1.11 L; 188/71.5

(58) Field of Classification Search
USPC ............... 188/1.11 L, 1.11 B, 71.5, 72.1, 162
See application file for complete search history.

(56) References Cited

U.S. PATENT DOCUMENTS

| | | |
|---|---|---|
| 5,226,509 A | 7/1993 | Smith |
| 5,310,023 A | 5/1994 | Martinez |
| 5,848,673 A | 12/1998 | Strauss et al. |
| 7,108,107 B2 | 9/2006 | Ralea et al. |
| 2007/0125607 A1 | 6/2007 | Ralea et al. |
| 2010/0207618 A1 | 8/2010 | Erickson et al. |
| 2010/0286881 A1 | 11/2010 | Cahill |

FOREIGN PATENT DOCUMENTS

| | | |
|---|---|---|
| EP | 0566006 | 10/1993 |
| EP | 0789156 | 8/1997 |
| EP | 1914135 A1 * | 4/2008 |
| EP | 1978273 | 10/2008 |
| GB | 2310015 | 8/1997 |

OTHER PUBLICATIONS

FR; Preliminary Search Report dated Sep. 2, 2011 in Application No. 0959348.
Patent Act 1977: Search Report under Section 17(5), dated Mar. 1, 2010.
GB; Examination Report dated Aug. 1, 2011 in Application No. GB0902431.6.
Office Action Restriction dated Jul. 25, 2012 in U.S. Appl. No. 12/372,069.
Office Action dated Oct. 11, 2012 in U.S. Appl. No. 12/372,069.

* cited by examiner

*Primary Examiner* — Pamela Rodriguez
(74) *Attorney, Agent, or Firm* — Snell & Wilmer L.L.P.

(57) ABSTRACT

A brake measurement system comprising a measurement mechanism for measuring brake wear operatively coupled to a moveable member of a brake assembly is provided. The system further includes a displacement sensor and a visual indicator. The displacement sensor is operatively coupled to the measurement mechanism, wherein movement of the moveable member is converted by the measurement mechanism into a displacement sensed by the displacement sensor. The visual indicator is operatively connected to the measurement mechanism, wherein the visual indicator displays the movement of the moveable member and consequently the wear of the brake stack at a point on the exterior of an aircraft brake housing for inspection.

17 Claims, 12 Drawing Sheets

BRAKE WEAR MEASUREMENT SYSTEM AND METHOD

CROSS-REFERENCE TO RELATED APPLICATIONS

This application is a continuation-in-part of U.S. application Ser. No. 12/372,069, filed on Feb. 17, 2009, and entitled "BRAKE WEAR MEASUREMENT SYSTEM", the content of which is hereby incorporated by reference in its entirety.

FIELD OF INVENTION

This invention generally relates to braking systems, and more particularly, to electronic brake control systems for aircraft.

BACKGROUND OF THE INVENTION

Prior art aircraft brake systems often employ wear pin indicators to measure overall wear of the brake disk stack. Brake wear is indicated by the length of the pin relative to a reference plate. This system generally requires a visual inspection of the pin to determine wear. However, the wear pin is typically installed as part of the brake assembly inside the aircraft wheel making visual inspection difficult. Such installation and inspection is also potentially difficult because of the harsh environment created by the aircraft braking system and the closed system created when the brake assembly is installed inside the wheel. Therefore, a longstanding need exists to provide for visual brake wear measurement on the exterior of the aircraft brake and to exhibit greater precision.

SUMMARY OF THE INVENTION

In various embodiments, the aircraft brake wear measurement systems comprise a measurement mechanism operatively coupled to a moveable member (e.g., a pressure plate and/or piston head) of a brake assembly. A displacement sensor is operatively coupled to the measurement mechanism. Movement of the moveable member is converted by the measurement mechanism into a displacement sensed by the displacement sensor.

The displacement sensor may be fitted with a scraper that engages the measurement mechanism and removes contaminants and debris from a measured surface of the measurement mechanism. The brake wear measurement system may further comprise a mechanical calibration mechanism that interfaces with the measurement mechanism providing for single point calibration. In an embodiment, the displacement sensor is fitted with a connector, enabling communication of the displacement sensor to a brake control system (or other aircraft system). The measurement mechanism may further comprise a visual indicator that is capable of being inspected on the exterior of an aircraft brake housing when the brake wear measurement system is installed. The measurement mechanism may be configured in any manner which allows the displacement sensor to be configured to measure linear, rotational, and/or angular displacement, for example, a twisted spline, drill bit, rack and pinion assembly, cable and pulley system assembly, hinge, spring, spring loaded cable and threaded bolt assembly, cam and lever assembly, spring loaded lever assembly, pneumatic cylinder, and/or bent wear pin or other geometries.

DETAILED DESCRIPTION

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

The brake wear measurement system uses a displacement sensor and a visual indicator capable of being inspected on the exterior of an aircraft brake housing. The use of a displacement sensor and visual indicator allows the wear of the aircraft brakes to be captured and reported electronically in a central location and physically inspected with no or minimal disassembly of the aircraft brake system. In one embodiment, the brake wear system makes use of at least two brake wear monitoring devices, particularly a displacement sensor and a visual indicator, to provide redundancy. The system allows for inspection of aircraft brake stack wear during daytime, nighttime, and/or when the aircraft is not powered on, without any (or with minimal) removal or disassembly of the aircraft wheel or aircraft brake.

Further, since a primary use of the brake wear measurement system is in conjunction with aircraft brakes, a feature of the system is the ability to tolerate the harsh wheel and brake environment. In particular, temperature and non-axial vibration levels are often very high in aircraft brake systems. Because of these harsh environmental conditions and general best practices in the aerospace industry, various embodiments are configured with low profiles to minimize weight and/or the impact of vibration loads. These embodiments allow the aircraft brake measurement system to conform, for example, with space constraints when installed with the aircraft brakes in the brake housing. The incorporation of a visual indicator on the exterior of the aircraft brake housing also provides the ability to measure brake stack wear at a more convenient location. In an embodiment, the displacement sensor may be mounted outside of the aircraft brake housing, and may measure brake stack wear mechanically communicated by a visual indicator. For example, the visual indicator may be fitted with a cable, wire, rod, or similar structure that mechanically communicates brake stack wear to a displacement sensor and allows for visual inspection of brake stack wear in a convenient location. The brake wear measurement systems described herein are robust in meeting various design requirements, including such harsh environmental requirements.

Preliminarily, an aircraft brake generally comprises a wheel disc that is coupled to and turns with an aircraft wheel, a brake stack that applies a frictional stopping force to the wheel disc, a pressure plate that applies a force to the brake stack causing the brake stack to contact the wheel disc, and a piston which drives the pressure plate into the brake stack causing the brake stack to apply a frictional braking force to the wheel disc. As designed, the brake stack wears as it applies a frictional braking force to the wheel disc.

In various embodiments, brake stack wear can be monitored by evaluating the displacement between a moveable member (e.g., a pressure plate or piston head) and a reference point. The reference point may be any fixed structure in the brake system, such as a piston support or piston housing. As the brake stack applies a braking force, the stack becomes thinner and the distance between the moveable member and the reference point increases proportionally to the amount of brake stack wear. The wear of the brake stack is monitored so the brake stack can be serviced when brake stack wear reaches a specified wear point. A brake wear measurement system may be installed with the aircraft brake in an aircraft brake housing.

In an embodiment, the brake wear measurement system comprises a measurement mechanism in combination with a displacement sensor, a mechanical calibration mechanism, and a visual indicator to evaluate brake stack wear. The measurement mechanism is operatively coupled to a pressure plate and/or a piston head and is in communication with a displacement sensor that measures displacement. The visual indicator is attached to a free end of the measurement mechanism and is operatively coupled to the measurement mechanism. The mechanical calibration mechanism is coupled to the displacement sensor of the aircraft brake and provides for single point calibration of the measurement mechanism. In this embodiment, the visual indicator passes through the aircraft brake housing, allowing the visual indicator to be inspected without (or with minimal) internal inspection of the aircraft brake housing.

In accordance with various embodiments, the brake wear measurement mechanism is any structure configured to measure the distance from a reference point to a moveable member, where the distance moved by the moveable member is proportional to the amount of wear of a brake stack. Exemplary embodiments (described below in more detail) depict various types of measurement mechanisms that may be attached to a moveable member. These measurement mechanisms may include, for example, a twisted spline geometry, a drill bit, a rack and pinion assembly, a cable and pulley system assembly, a hinge, a spring, a spring loaded cable and threaded bolt assembly, a cam and lever assembly, a spring loaded lever assembly, a pneumatic cylinder, and/or a bent wear pin.

In accordance with various embodiments, the displacement sensor is any apparatus configured to capture a change in movement. In this regard, the displacement sensor measures movement of a measurement mechanism (discussed above) or may partially or fully replace the measurement mechanism by remotely sensing a change in the position of a moveable member from a reference point. Exemplary embodiments described below measure movement of the measurement mechanism. The movement measured by the displacement sensor may be linear, rotational, or angular movement. This movement may be captured by a sensor, such as a linear variable differential transformer, rotary variable differential transformer, or potentiometer. In general, selection of the appropriate displacement sensor may depend on various factors, including the geometry of the measurement mechanism, orientation of the measurement mechanism to the displacement sensor, environmental factors, and the like.

In accordance with various embodiments, the displacement sensor may further comprise a mechanical calibration mechanism. The mechanical calibration mechanism may be configured such that calibration of the brake wear measurement system may be performed independently from the aircraft electrical system. In one embodiment, the mechanical calibration mechanism is coupled to the displacement sensor and engages the measurement mechanism to provide single point calibration, preventing the measurement mechanism from moving. This allows a known reference point to be established for the brake wear measurement system. In response to the measurement mechanism being coupled to the brake pressure plate and the displacement sensor being at the known reference point, the mechanical calibration mechanism may be disengaged from the measurement mechanism and fixed to the displacement sensor. Fixing the mechanical calibration mechanism to the displacement sensor fully or partially prevents the mechanism from interfering with the brake wear measurement system or aircraft brake system, while in operation.

In accordance with various embodiments, the displacement sensor may further comprise an interface bushing fitted with a scraper. The interface bushing and scraper may be installed such that the scraper fully or partially clears contaminants and debris from the leading edge or surface of the measurement mechanism that is tracked by the displacement sensor as the measurement mechanism is displaced. The interface bushing and scraper may be coupled to the sensor such that the scraper remains in place with limited or no backlash. This coupling allows the measured portion of the measurement mechanism to interface effectively with the displacement sensor and fully or partially prevents binding, jamming, contamination, and the like.

Figure 1:
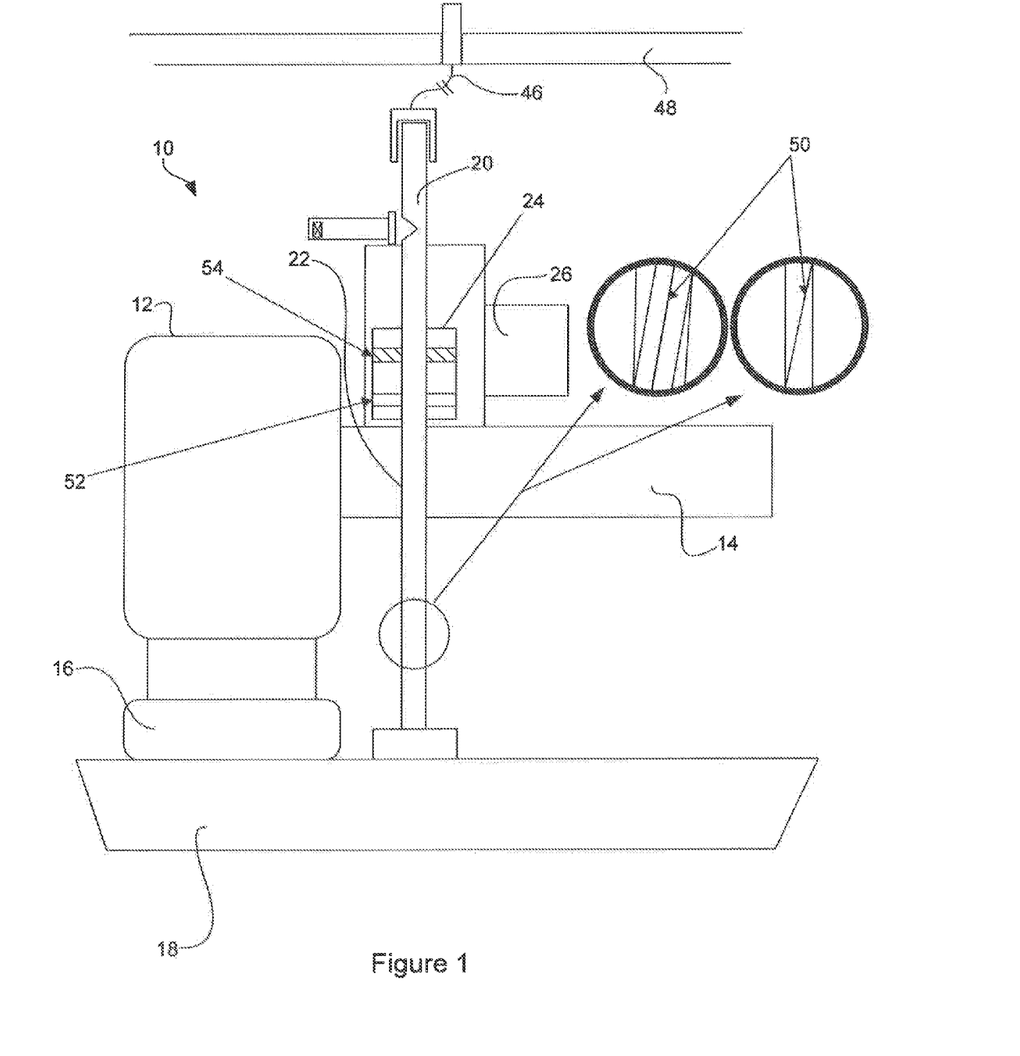
FIG. 1 is a schematic of a brake wear measurement system using a twisted spline shaft and a mechanical calibration mechanism in accordance with an embodiment.

Referring to FIG. 1, and in accordance with an embodiment, brake wear measurement system 10 comprises a piston 12, a support member 14, a head 16, a pressure plate 18, a measurement mechanism 20, a measured surface 50, a hole 22, a displacement sensor 24, an interface bushing 52, a scraper 54, a mechanical calibration mechanism 56, a connector 26, a visual indicator 46, and a brake housing 48. Head 16 of piston 12 or other type actuator is configured to apply pressure to pressure plate 18 in order to exert a controllable braking force on the brake stack (not shown). As the brake stack wears, the stack becomes thinner and the distance between pressure plate 18 and piston 12/support 14 increases.

Brake wear is measured by measuring the displacement between the reference of displacement sensor 24 and brake pressure plate 18. The geometry of measurement mechanism 20 is such that, as pressure plate 18 moves linearly, measurement mechanism 20 is displaced along a linear, angular, or rotational path. In various embodiments, linear, angular, or rotational measurement may be taken by displacement sensor 24 depending on its orientation to measurement mechanism 20. The motion of measurement mechanism 20 also causes visual indicator 46 to move a proportional distance, displaying the amount of wear of the brake stack and allowing visual inspection on the exterior of aircraft brake housing 48. In an embodiment, outputs of displacement sensor 24 and visual indicator 46 are proportional to the absolute linear displacement of brake pressure plate 18, which is proportional to the wear of the brake stack.

In accordance with an embodiment, brake wear measurement system 10 includes measurement mechanism 20 which is attached at one end to pressure plate 18. At another end, measurement mechanism 20 may be connected to visual indicator 46. Visual indicator 46 is installed as part of brake wear measurement 10, such that visual indicator 46 protrudes through brake housing 48. Measurement mechanism 20 extends away from pressure plate 18 and through a hole 22 in support 14. Hole 22 is sized such that measurement mechanism 20 may freely move linearly through hole 22. In various embodiments, brake wear measurement system 10 further comprises a displacement sensor 24. Displacement sensor 24 is aligned axially with hole 22, such that measurement mechanism 20 passes through displacement sensor 24.

In accordance with an embodiment, brake wear measurement system 10 includes mechanical calibration mechanism 56 which is operatively coupled to displacement sensor 24. Mechanical calibration mechanism 56 is capable of being attached to measurement mechanism 20, such that mechanical calibration mechanism 56 fixes measurement mechanism 20 at a specified calibration point. In response to the calibration point being established, mechanical calibration mechanism 56 is removed from measurement mechanism 20 and partially or fully fixed in place on displacement sensor 20, such that mechanical calibration mechanism 56 does not interfere with the aircraft brake or brake wear measurement system 10 while in operation.

In accordance with an embodiment, displacement sensor 24 may be secured to the piston housing 12 and/or support 14 via a bracket or the like so as to extend away from the piston housing 12 and/or support 14 in a plane parallel to the pressure plate 18. In such embodiments, hole 22 may be eliminated.

Figure 2:
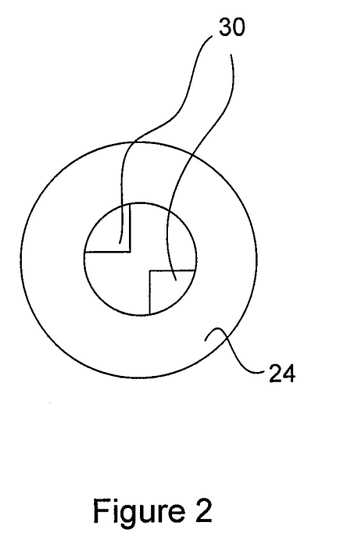
FIG. 2 is a schematic of an angular displacement sensor in accordance with an embodiment.

In accordance with an embodiment, measurement mechanism 20 may be configured with a twisted spline geometry, such as a twisted flat piece of metal, in a region which communicates with displacement sensor 24. Displacement sensor 24 may be configured to include scraper 54 coupled to an interface bushing 52. Interface bushing 52 interfaces with measured surface 50 to partially or fully clear debris and contaminates. Displacement sensor 24 may also be configured to include one or more engagement members 30, as shown in FIG. 2, configured to engage and/or follow one of more measured surface 50 of measurement mechanism 20 as measurement mechanism 20 passes linearly therethough. As the brake stack wears, measurement mechanism 20 moves in the linear direction (e.g., up/down in relation to FIG. 1) with pressure plate 18. The twisted spline geometry of measurement mechanism 20 converts the linear displacement of measurement mechanism 20 into an angular displacement that is measured by displacement sensor 24. In this manner, the output of displacement sensor 24 is proportional to the linear displacement of the measurement mechanism 20, and thus, that of pressure plate 18. The linear displacement of pressure plate 18 in turn represents an amount of brake stack wear.

Figure 3:
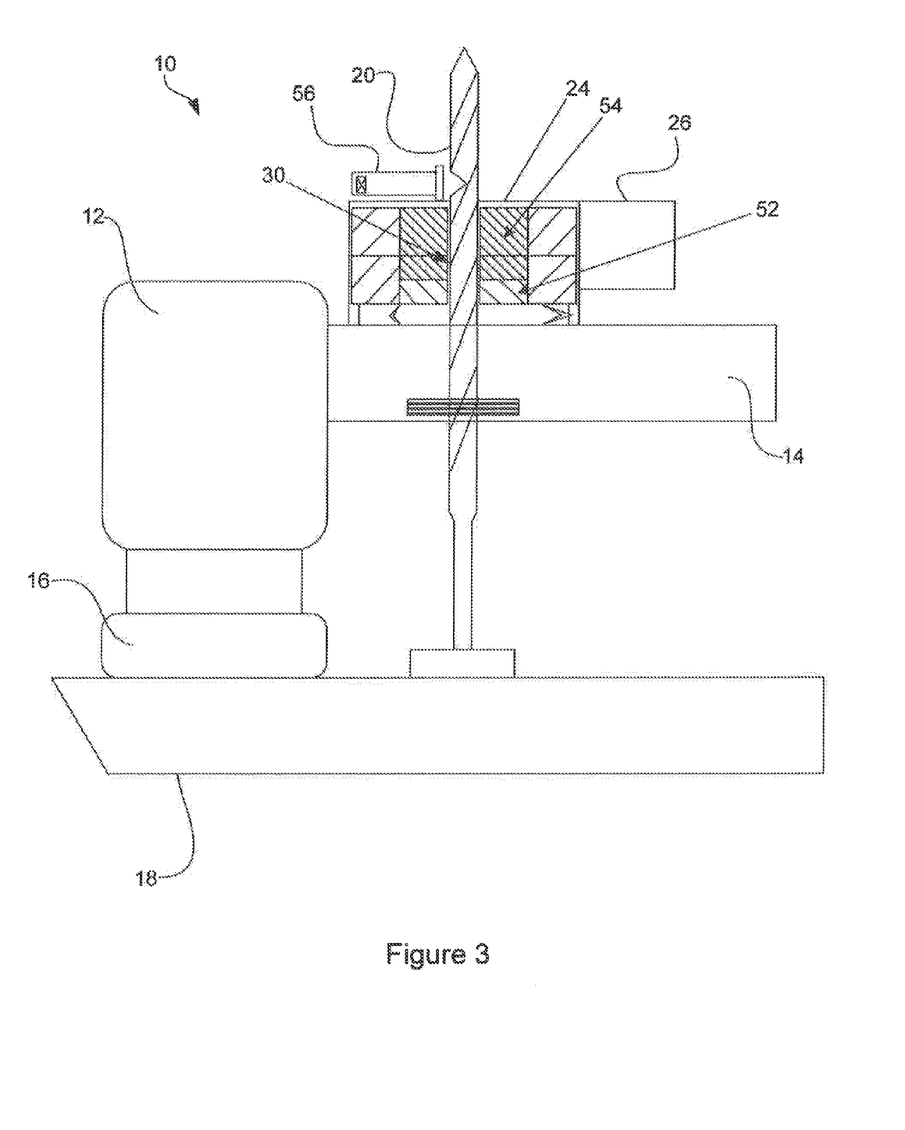
FIG. 3 is a schematic of a brake wear measurement system using a twisted spline shaft and a mechanical calibration mechanism in accordance with an embodiment.

With reference now to FIG. 3, and in accordance with an embodiment, measurement mechanism 20 may be configured similar to a drill bit. In such an embodiment, displacement sensor 24 and interface bushing 52 may be coupled to scraper 54 and configured to partially or fully clear contaminants and debris from measured surface 50 of measurement mechanism 20. Engagement member 30 may be installed in displacement sensor 24, such that engagement member 30 tracks the linear movement of the drill bit along measured surface 50. The linear motion of the drill bit is converted into an angular displacement that is measured by displacement sensor 24.

Figure 4:
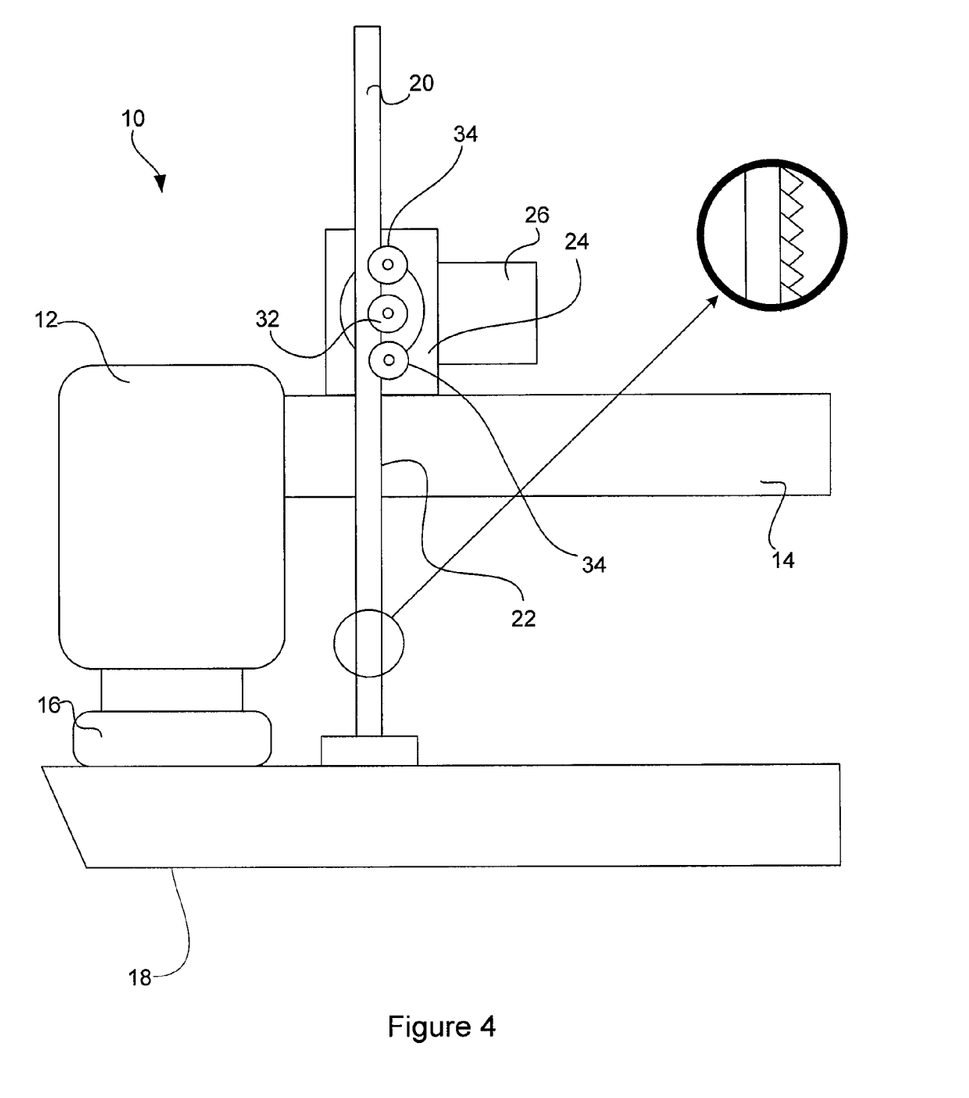
FIG. 4 is a schematic of a brake wear measurement system using a rack and pinion assembly in accordance with an embodiment.

With reference now to FIG. 4, and in accordance with an embodiment, measurement mechanism 20 is configured as a geared rack that travels along a guide 34 and is operatively coupled to a pinion gear 32. Pinion gear 32 is operatively coupled to displacement sensor 24. Measurement mechanism 20 is operatively coupled to pressure plate 18. Movement of pressure plate 18 causes linear movement of measurement mechanism 20 and forces pinion gear 32 to rotate. As discussed above, the linear movement of pressure plate 18 is proportional to brake stack wear. Consequently, the movement of measurement mechanism 20 and resulting rotation of pinion gear 32 are proportional to brake stack wear. Displacement sensor 24 measures the rotation of pinion gear 32.

Figure 5:
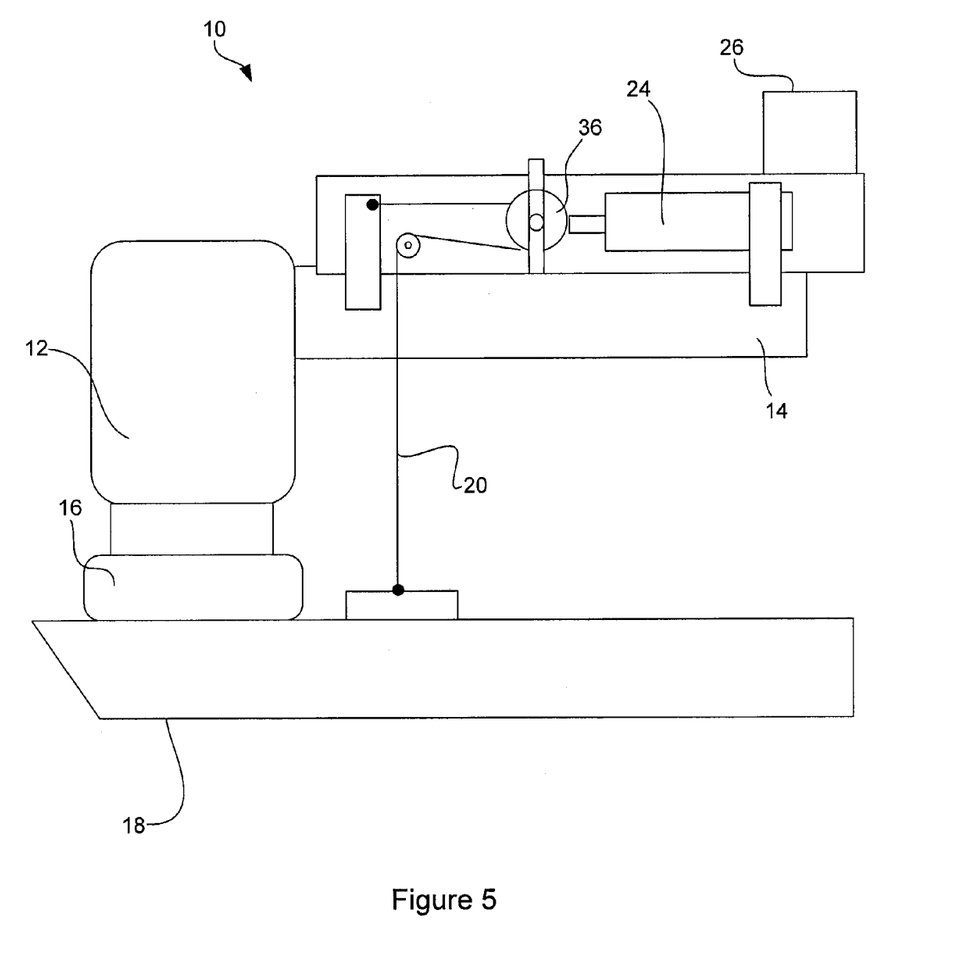
FIG. 5 is a schematic of a brake wear measurement system using a cable and pulley system in accordance with an embodiment.

With reference to FIG. 5, and in accordance with an embodiment, measurement mechanism 20 is configured as a cable connected to pressure plate 18 and a pulley system 36. As shown, pulley system 36 is configured with two pulleys, however, more pulleys may be used. Pulley system 36 is operatively coupled to displacement sensor 24. As such, linear movement of pressure plate 18 causes measurement mechanism 20 to move, forcing pulley system 36 to contract. This contraction is proportional to the linear movement of pressure plate 18 and consequently, is proportional to brake stack wear. The connection between pulley system 36 and displacement sensor 24 allows displacement sensor 24 to measure the movement of pressure plate 18, by way of the contraction of pulley system 36.

Figure 6:
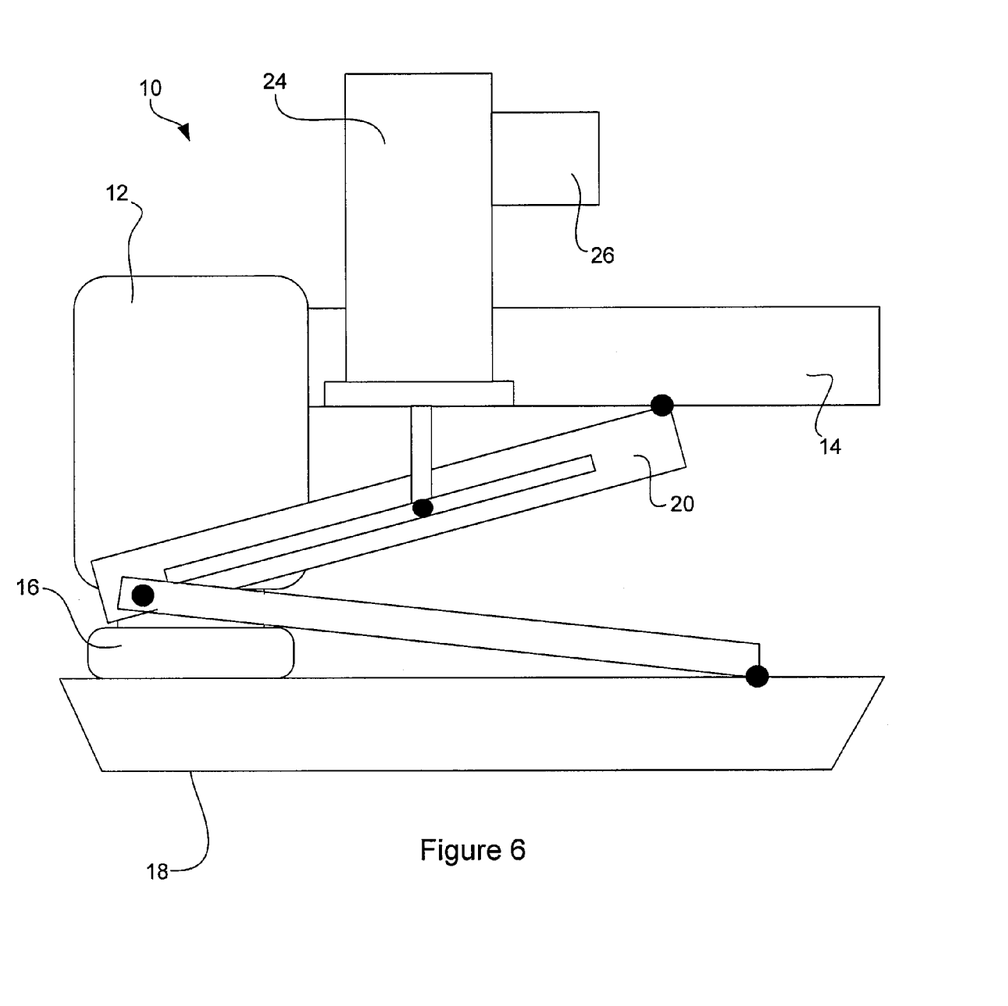
FIG. 6 is a schematic of a brake wear measurement system using a hinge in accordance with an embodiment.

With reference to FIG. 6, and in accordance with an embodiment, brake wear measurement mechanism 20 is configured as a slotted hinge, wherein the hinge comprises at least two hinge members operatively coupled at a pivoting joint. One hinge member is connected to pressure plate 18 and another hinge member is connected to displacement sensor 24. As pressure plate 18 compresses the brake stack, measurement mechanism 20 expands in proportion to the displacement of pressure plate 18. The expansion of measurement mechanism 20 is measured by displacement sensor 24. Given that the displacement of pressure plate 18 is proportional to brake stack wear, and that elongation of measurement mechanism 20 is proportional to the displacement of pressure plate 18, displacement sensor 24 is able to measure the total wear of the brake stack.

Figure 7:
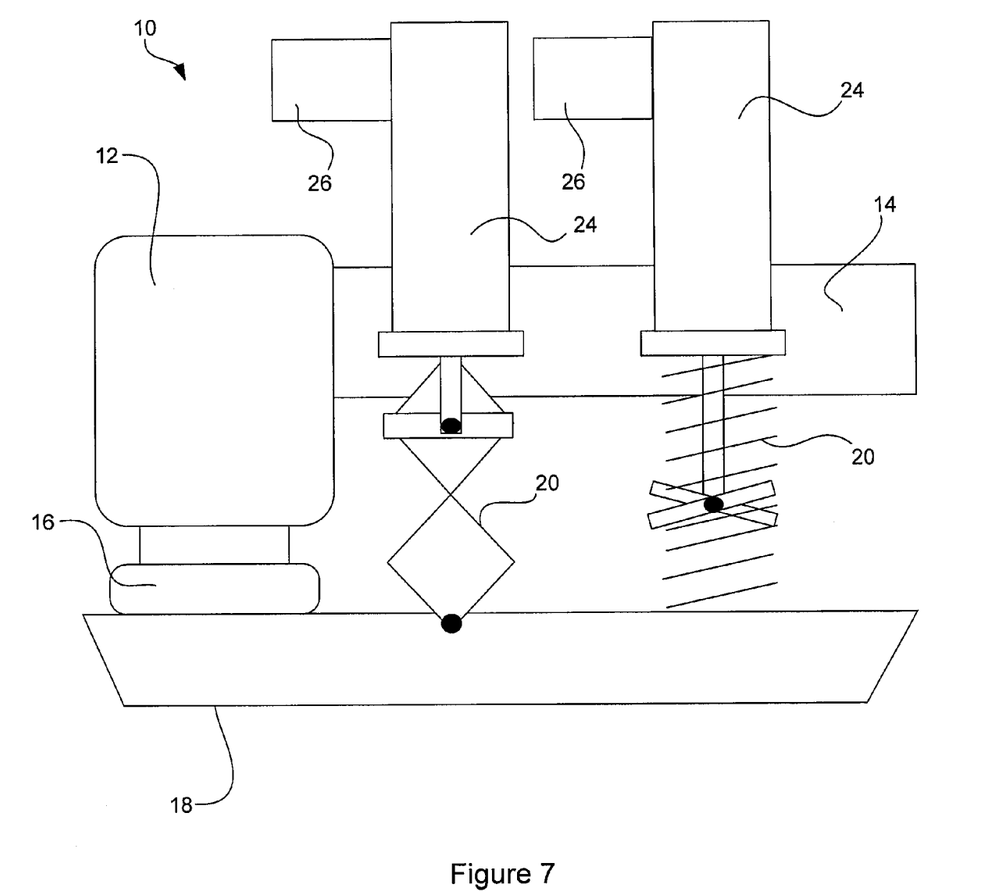
FIG. 7 is a schematic of a brake wear measurement system using a spring and a scissor jack mechanism in accordance with an embodiment.

With reference to FIG. 7, and in accordance with an embodiment, brake wear measurement mechanism 20 is configured as a spring and scissor jack mechanism. In various embodiments, the spring may be an accordion style spring, a cylindrical spring, a torsion spring, or any other device suitable for communicating displacement. One free end of the spring is connected to pressure plate 18 and another free end of the spring is connected to displacement sensor 24. Further, one free end of the scissorjack mechanism is connected to pressure plate 18 and one free end of the scissor jack mechanism is connected to displacement sensor 24. Linear movement of pressure plate 18 causes measurement mechanism 20 to expand, causing a displacement by the spring and the scissorjack mechanism to be communicated to displacement sensor 20 which is proportional to the linear displacement of pressure plate 18 and brake stack wear. Displacement sensor 24 is thus able to evaluate the spring displacement and determine brake stack wear.

Figure 8:
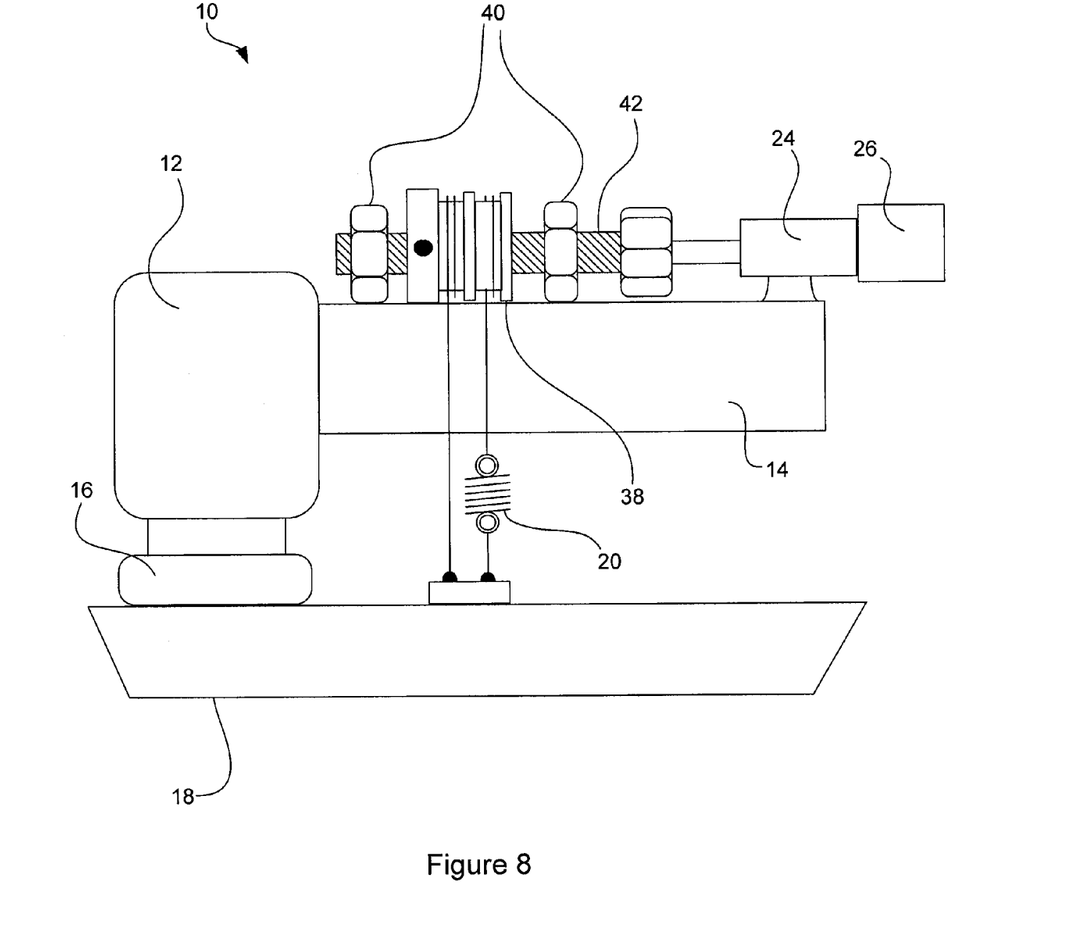
FIG. 8 is a schematic of a brake wear measurement system using a spring loaded cable and threaded rod assembly in accordance with an embodiment.

With reference to FIG. 8, and in accordance with an embodiment, measurement mechanism 20 is configured as a spring loaded cable. In this embodiment, measurement mechanism 20 is connected to a cable carrier 38 and pressure plate 18. Cable carrier 38 is fixed on a threaded rod 42. Threaded rod 42 is installed in a carrier 40, which allows threaded rod 42 to rotate along its threads through carrier 40 when measurement mechanism 20 is displaced by pressure plate 18. Carrier 40 is also fixed to housing/support 14. Threaded rod 42 is operatively connected to displacement sensor 24, allowing displacement sensor 24 to measure the displacement of threaded rod 42 in carrier 40, which is proportional to the linear movement of measurement mechanism when it is acted upon by pressure plate 18. Displacement sensor 24 is therefore able to measure the displacement of threaded rod 42, which is proportional to brake stack wear.

Figure 9:
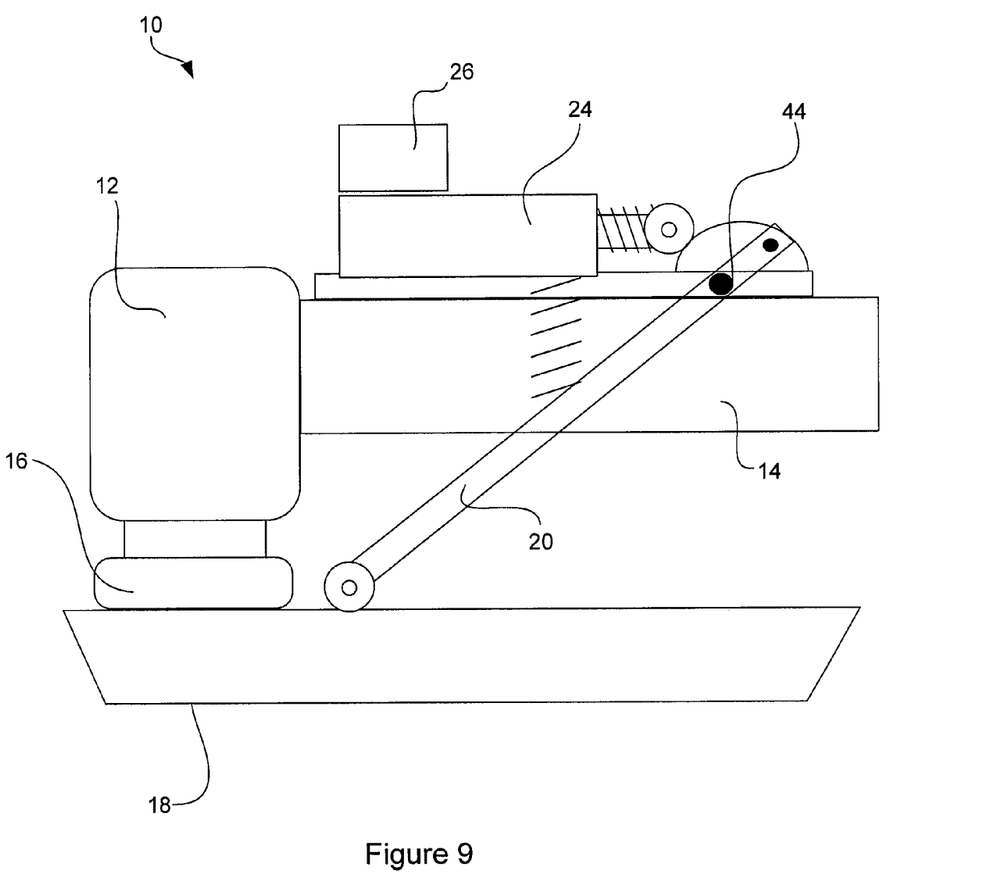
FIG. 9 is a schematic of a brake wear measurement system using a cam and lever in accordance with an embodiment.

With reference to FIG. 9, and in accordance with an embodiment, measurement mechanism 20 is configured as a cam and lever assembly. Measurement mechanism 20 is fixed at a pivot point 44 to brake wear measurement system 10 and operatively connected to pressure plate 18 and displacement sensor 24. Linear movement of pressure plate 18 causes measurement mechanism 20 to rotate about pivot point 44, such that the cam, which is coupled to the lever, communicates the rotational displacement of the lever to displacement sensor 24. This rotation communicates the wear of the brake stack through the linear displacement of pressure plate 18 to displacement sensor 24.

Figure 10:
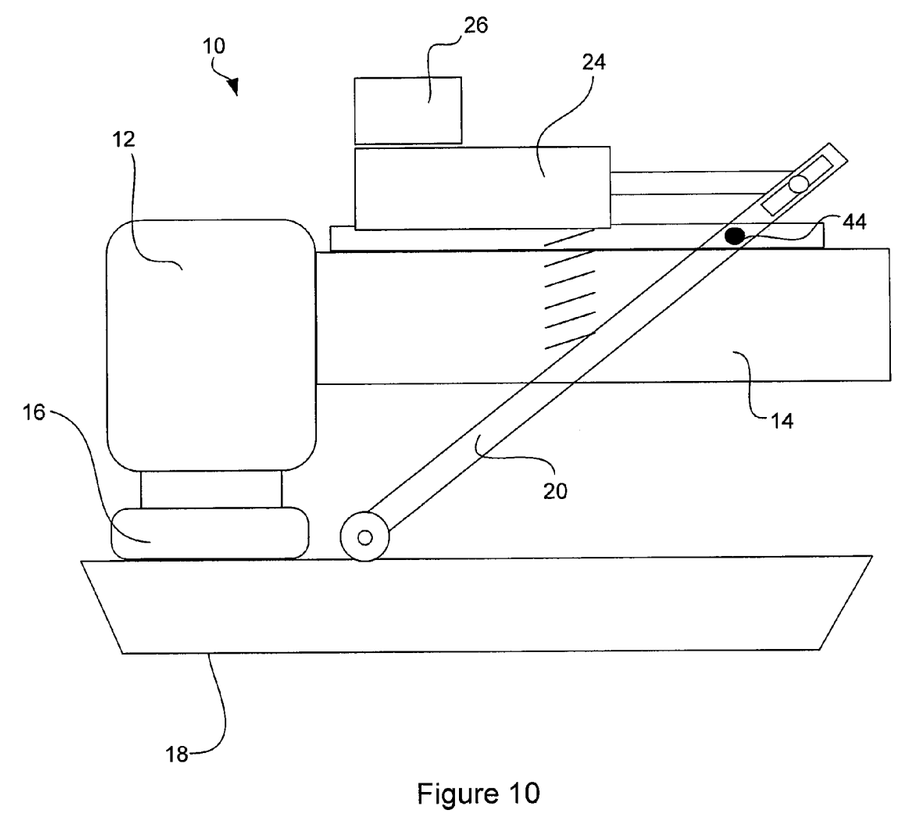
FIG. 10 is a schematic of a brake wear measurement system using a spring loaded lever in accordance with an embodiment.

With reference to FIG. 10, and in accordance with an embodiment, measurement mechanism 20 is configured as a spring loaded lever assembly. Measurement mechanism 20 is coupled at a pivot point 44 to housing 14 of brake wear measurement system 10 and operatively connected to pressure plate 18 and displacement sensor 24. Linear movement of pressure plate 18 causes measurement mechanism 20 to rotate about pivot point 44, such that the rotation of the lever compresses displacement sensor 24. This rotation communicates the wear of the brake stack through the linear displacement of pressure plate 18 to displacement sensor 24.

Figure 11:
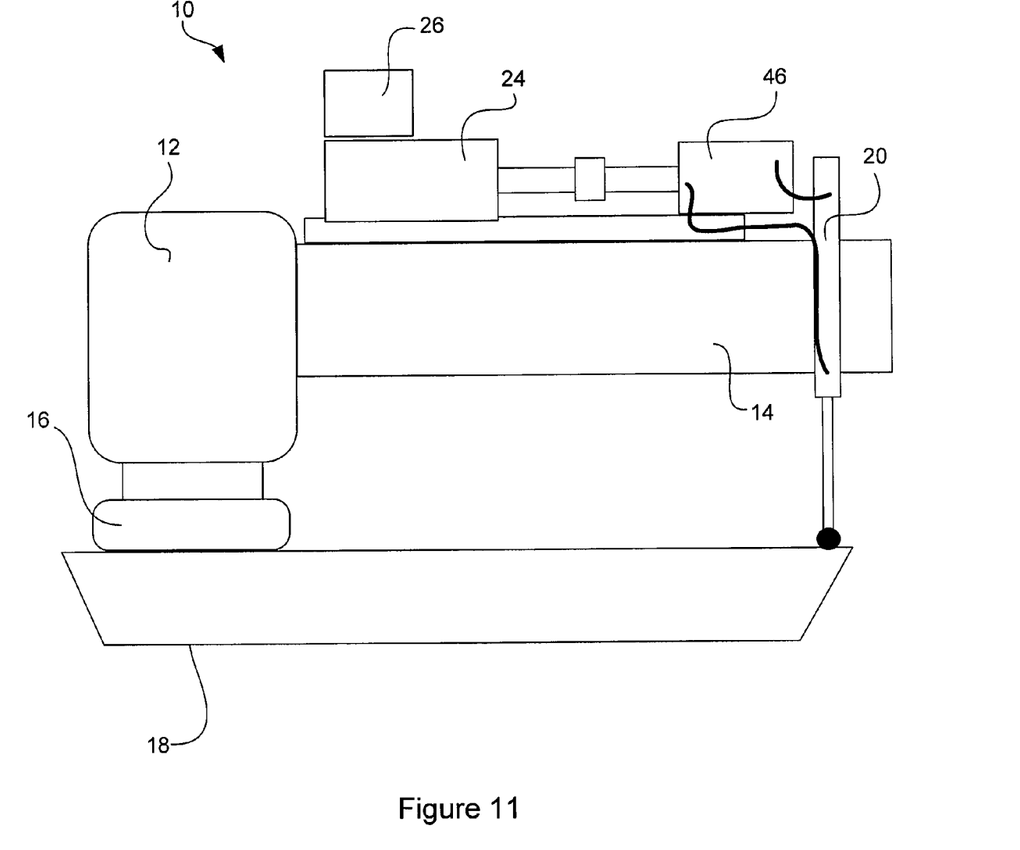
FIG. 11 is a schematic of a brake wear measurement system using a pneumatic cylinder in accordance with an embodiment.

With reference to FIG. 11, and in accordance with an embodiment, measurement mechanism 20 is configured as a pneumatic cylinder. Measurement mechanism 20 is operatively connected to pressure plate 18 and pneumatically connected to a pneumatic cylinder 46. Pneumatic cylinder 46 is operatively connected to displacement sensor 24. Movement of pressure plate 18 causes a proportional movement of measurement mechanism 20. This movement causes a pressure change in pneumatic cylinder 46 that is measured by displacement sensor 24 and is proportional to brake stack wear.

Figure 12:
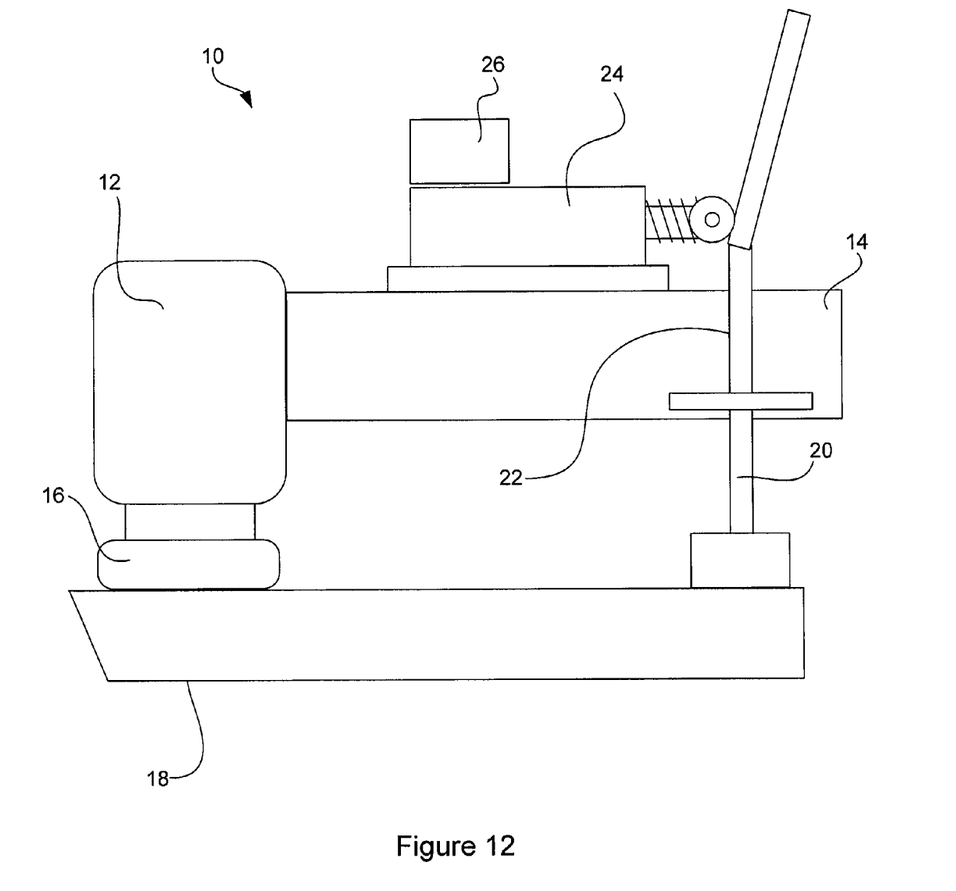
FIG. 12 is a schematic of a brake wear measurement system using a bent wear pin in accordance with an embodiment.

With reference to FIG. 12, and in accordance with an embodiment, measurement mechanism 20 is configured as a bent wear pin. Measurement mechanism 20 is operatively connected to pressure plate 18 and displacement sensor 24. Displacement sensor 24 may be connected to measurement mechanism 20 around a point where measurement mechanism 20 becomes angled. Measurement mechanism 20 moves linearly with pressure plate 18. As measurement mechanism 20 moves with pressure plate 18, displacement sensor 24 tracks the linear displacement along the angled portion of measurement mechanism 20. The total linear displacement of the brake stack, which is proportional to the linear movement of pressure plate 18 and measurement mechanism 20, is communicated to displacement sensor 24 as a change in measured angle.

In accordance with various embodiments, the output of displacement sensor 24 may be an electrical signal that is provided via a connector 26 to a remaining portion of the overall brake system (not shown). The output of displacement sensor 24 represents the brake wear and may be utilized by the system to provide an indication as to when the brake stack should be replaced, serviced, and/or the like. Exemplary displacement sensors 24 suitable for use in brake wear measurement system 10 are commercially available from Moog Components Group, located at 1501 North Main Street, Blacksburg, Va., 24060, and marketed as "low cost brushless pancake resolvers". Other types of known displacement sensors 24 may also be used.

In various embodiments, measurement mechanisms such as those described above may also be attached to the piston head 16, and thus provide an indication of the position of the piston head 16 and/or brake position.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake measurement system, comprising:
a measurement mechanism having a first end and a second end;
a moveable member operatively coupled near the first end of the measurement mechanism;
a visual indicator operatively coupled near the second end of the measurement mechanism, the visual indicator being visible outside a brake housing;
a displacement sensor operatively coupled to the measurement mechanism, wherein movement of the moveable member is converted by the measurement mechanism into a displacement measured by the displacement sensor and the visual indicator; and a mechanical calibration mechanism operatively coupled to the displacement sensor and capable of being detachably connected to the measurement mechanism.

2. The brake measurement system of claim 1, wherein the system measures brake wear.

3. The brake measurement system of claim 2, wherein the displacement sensor further comprises an engagement member operatively coupled to a drill bit.

4. The brake measurement system of claim 1, wherein the measurement mechanism is a twisted spline.

5. The brake measurement system of claim 1, wherein the measurement mechanism is a drill bit.

6. The brake measurement system of claim 1, wherein the measurement mechanism comprises at least one of: rack and pinion assembly, cable and pulley system assembly, hinge, spring, spring loaded cable and threaded bolt assembly, cam and lever assembly, spring loaded lever assembly, pneumatic cylinder, or bent wear pin.

7. The brake measurement system of claim 1, wherein the displacement sensor measures linear displacement.

8. The brake measurement system of claim 1, wherein the displacement sensor measures rotational displacement.

9. The brake measurement system of claim 1, wherein the displacement sensor measures angular displacement.

10. The brake measurement system of claim 1, further comprising a connector in electronic communication with the displacement sensor which communicates a displacement measured by the displacement sensor.

11. The brake measurement system of claim 1, wherein the moveable member is a brake pressure plate.

12. The brake measurement system of claim 1, wherein the moveable member is an actuator head which engages a brake pressure plate.

13. The brake measurement system of claim 12, wherein the measurement mechanism is a twisted spline.

14. The brake measurement system of claim 12, wherein the measurement mechanism is a drill bit.

15. A brake measurement system, comprising:
a measurement mechanism, having a first end and a second end;
a moveable member operatively coupled near the first end of the measurement mechanism, wherein the moveable member is at least one of a brake pressure plate or an actuator head which engages the brake pressure plate;
an angular displacement sensor, operatively coupled to the measurement mechanism, wherein movement of the moveable member is converted by the measurement mechanism into an angular displacement measured by the angular displacement sensor;
a mechanical calibration mechanism operatively coupled to the displacement sensor and capable of being detachably connected to the measurement mechanism;
an interface bushing coupled to a scraper and operatively coupled to the displacement sensor, wherein the scraper is in contact with a measured surface of the measurement mechanism;
a connector in electronic communication with the angular displacement sensor which communicates a displacement measured by the angular displacement sensor; and
a visual indicator operatively coupled near the second end of the measurement mechanism, the visual indicator being visible outside a brake housing.

16. A brake measurement system, comprising:
a measurement mechanism having a first end and a second end;
a moveable member operatively coupled near the first end of the measurement mechanism;
a visual indicator operatively coupled near the second end of the measurement mechanism, the visual indicator being visible outside a brake housing;
a displacement sensor operatively coupled to the measurement mechanism, wherein movement of the moveable member is converted by the measurement mechanism into a displacement measured by the displacement sensor and the visual indicator; and
an interface bushing coupled to a scraper and operatively coupled to the displacement sensor, wherein the scraper is in contact with a measured surface of the measurement mechanism.

17. The brake measurement system of claim 16, wherein the displacement sensor further comprises an engagement member operatively coupled to a twisted spline.

* * * * *